April 26, 1927.
J. M. ROWLAND
1,625,825
LIQUID WEIGHING APPARATUS
Filed Aug. 2, 1926
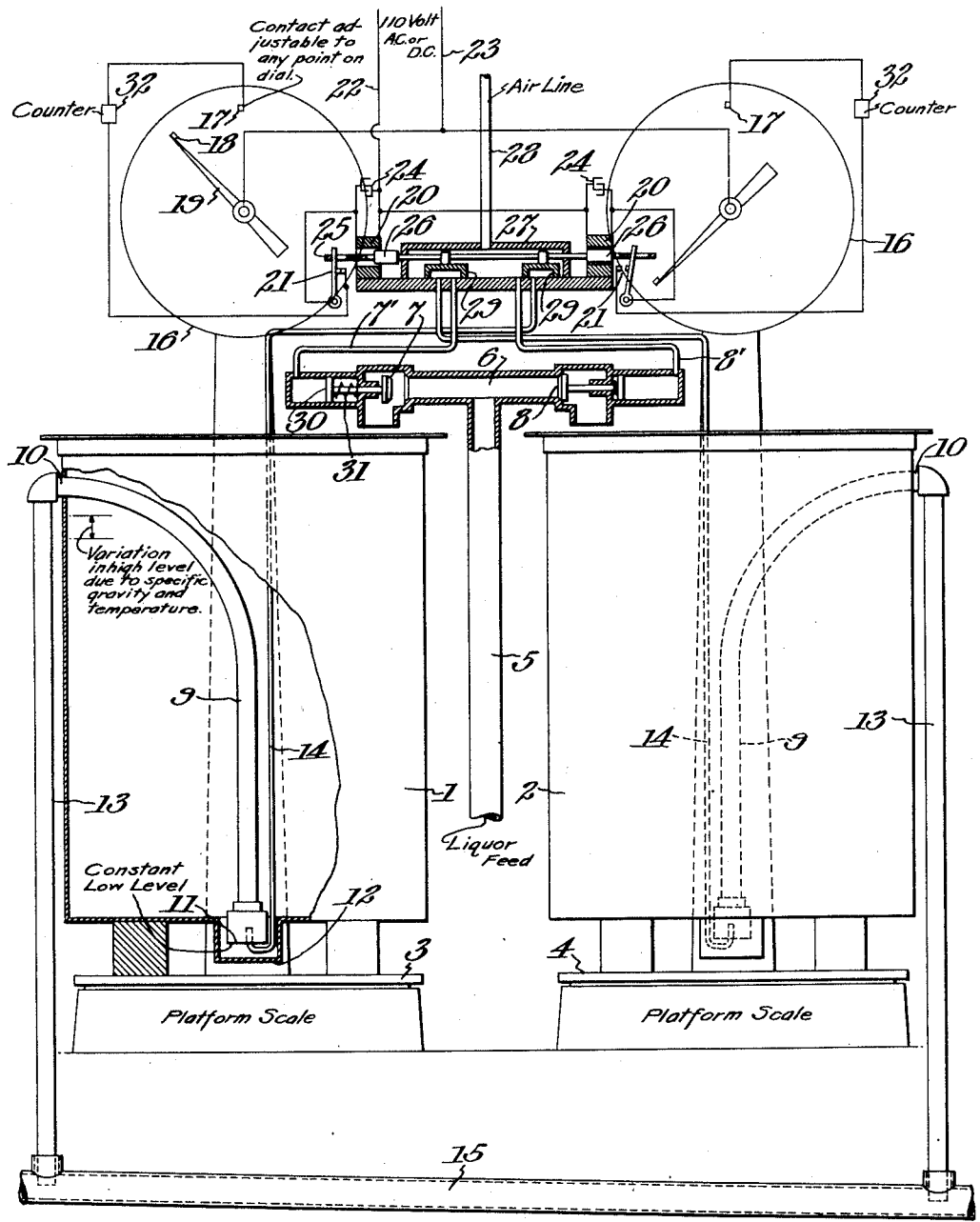

Patented Apr. 26, 1927.

1,625,825

UNITED STATES PATENT OFFICE.

JASPER M. ROWLAND, OF NIAGARA FALLS, NEW YORK, ASSIGNOR TO HOOKER ELECTROCHEMICAL COMPANY, OF NEW YORK, N. Y., A CORPORATION OF NEW YORK.

LIQUID-WEIGHING APPARATUS.

Application filed August 2, 1926. Serial No. 126,657.

This invention relates to liquid weighing apparatus and particularly to apparatus for the accurate weighing of a flowing stream of liquid. Many of the devices proposed for automatically weighing liquids are not satisfactory in operation since they are dependent upon the volume and not upon the weight of the liquid handled. The type of device which does depend upon the weight is unsatisfactory since the receivers into which the liquid flows are tipped to discharge the same and it is impractical to provide knife edges or bearings which permit accurate weighing for long periods of use.

In accordance with my invention, the liquid handled may be accurately weighed with the use of standard types of scales having the desired degree of accuracy. Accurate weighing of a flowing stream of liquid may be attained by delivering the liquid to a tank on a weighing platform, interrupting the flow of liquid when the desired weight is reached and discharging the tank through a siphon which is primed by the mechanism which interrupts the flow of liquid.

An object of the invention is to provide automatic liquid weighing apparatus for accurately weighing a flowing stream of liquid. Another object is to provide automatic weighing apparatus in which the weighing operation is independent of variations in the temperature and specific gravity of the flowing liquid. A further object is to provide apparatus for automatically weighing and recording the weight of a flowing liquid. More specifically, an object of the invention is to provide automatic liquid weighing apparatus comprising two tanks into one of which the stream of liquid is fed until the desired weight is reached and is then diverted into the other tank while the first tank is discharged through a fixed siphon.

These and other objects of the invention will be apparent from the following description when taken with the accompanying drawing in which the single figure is a somewhat diagrammatic illustration of one embodiment of the invention.

In the drawing, the numerals 1 and 2 indicate a pair of duplicate tanks which are mounted on platform scales 3 and 4, respectively. The stream of liquid which is to be weighed is delivered to the tanks through the feed pipe 5 and branch conduit 6 which has valves 7, 8 located at the two outlets therefrom. The outlet from each tank is through a pipe 9 which has its upper portion 10 extending through the tank above the highest level to which liquid will rise in the tank and which has its inlet end 11 located in a depression 12 in the bottom of the tank. The pipe 13 communicates with the upper end 10 of the pipe 9 and extends well below the bottom of the tank to form the longer leg of the discharge siphon. Air or gas for priming the siphon is introduced through the pipe 14 and the liquid is discharged from both of the tanks into a common delivery pipe 15. The mechanism for operating the inlet valves and priming the siphons may take various forms and is illustrated in the drawing as a combined electric and pneumatic system which is controlled by switches closing electrical circuits when the pointers of the separate scales move to predetermined positions.

The dial 16 of each scale is provided with an electrical contact 17 which may be adjustably secured at any desired point in the path of movement of a second electrical contact 18 which is carried by the pointer 19. In series with each switch 17, 18 and its respective solenoid 20 which it controls, is an auxiliary switch 21 and the simultaneous closing of both switches is necessary before current will pass from the lines 22, 23 to a particular solenoid. Condensers 24 may be shunted across the solenoids to prevent arcing. The two solenoids 20 are arranged in axial alinement and a rod 25 carries two armatures 26 which are spaced apart by a distance somewhat less than that between the two solenoids. The ends of the rod 25 project beyond the armatures and engage the movable members of the two switches 21. Each switch 21 is so constructed that it is opened by the rod 25 as the adjacent armature 26 is attracted by its solenoid. To permit the movement of the armature before the solenoid is de-energized by the opening of switch 21, a lost motion connection is provided between the rod 25 and the switch 21.

The rod 25 passes through a chamber 27 to which air or gas is supplied under pressure through the conduit 28 and the rod 25 carries two slide valves 29 which control the flow of gas to the inlet valves 7, 8 and to the siphons. The stems of valves 7, 8 are provided with pistons 30 which are urged toward valve opening position by springs 31.

The valves 7 and 8 are moved in opposition to the springs 31 by gas which is supplied under pressure from the chamber 27 through pipes 7', 8', respectively. The pipes 14 through which gas for priming the siphons is fed are so connected with the valve chamber 27 that the gas exhausted from behind the piston 30 of the inlet valve of one tank passes through the priming pipe 14 of the other tank.

Automatic counters 32 are placed in the respective solenoid circuits to register the number of times that each tank is filled and emptied.

As shown in the drawing, the valve 7 is opened and the liquid will feed into the tank 1 until a predetermined weight is reached at which instant the switch 17, 18 closes and the left-hand solenoid 20 is energized. The solenoid attracts the adjacent armature 26 and shifts the rod 25 to the left to place the pipe 7' in communication with the valve chamber 27. At the same time the right-hand slide valve 29 closes the communication betwen pipe 8' and the chamber and places the pipe 8' in communication with the pipe 14 which leads to tank 1. The gas which flows under pressure through the pipe 7' closes the valve 7 to stop the flow of liquid into tank 1 and the gas which is exhausted through the pipe 8' as spring 31 opens valve 8 will pass through the pipe 14 to prime the siphon for discharging the contents from tank 1. The movement of rod 25 opens the left-hand switch 21 and interrupts the flow of current through the adjacent solenoid. The liquid then flows into tank 2 until the predetermined weight is reached and the valves are then shifted to the right as the switch 17, 18 is closed. The parts are so designed that one tank will be fully emptied before the other tank is filled.

It will be noted that the load is at all times quiet upon the scales and that there are no moving parts except the scales and the solenoid-operated valve mechanism. The scales may be of standard construction to operate within a desired degree of accuracy and the solenoid-operated mechanism may be placed at some distance from the scales and cared for under good conditions. The supply of liquid to a tank is shut off immediately as soon as the desired weight is in the tank and the discharge of liquid is not dependent upon the varying level which a given weight of liquid may have under different conditions of temperature and specific gravity. By placing the lower end 11 of the siphon within a small depression in the bottom of the tank, substantially equal weights of liquid will be discharged at each operation, since a substantially constant weight of liquid remains in the tank after air enters the inlet 11 to break the siphon.

The invention may be used for the automatic weighing of any desired liquid by constructing the tank and associated parts of materials which are not affected by the liquid. While the embodiment described herein provides for a substantially continuous flow of liquid, it will be apparent that a single tank may be used when a continuous flow is not essential by an appropriate change in the mechanism for re-opening the valve after the discharge of the contents of the tank. It will also be obvious that when two tanks are employed the adjustable members 17 of the two switches may be set for operation at different weights and that the liquids may be discharged from the tanks to different points of use or storage.

It will be apparent that these and other changes in the various parts, their relative size, shape and location may be made without departing from the spirit of my invention as set forth in the following claims.

I claim:

1. Automatic liquid weighing apparatus comprising a tank located on a scale platform, a siphon outlet for said tank and having its upper bend located above the highest level reached by liquid within said tank, a gas pipe entering said siphon for initiating the discharge flow therethrough, and means operable when a predetermined weight of liquid has been introduced into said tank for delivering gas through said pipe to start said siphon.

2. Apparatus as set forth in claim 1, in combination with a feed pipe for introducing liquid into said tank, and means for stopping the introduction of liquid into said tank from said feed pipe when the said predetermined weight of liquid is reached.

3. Automatic liquid weighing apparatus comprising the combination with a pair of scale members, a tank carried by each of said members, and a siphon outlet for each tank, of means for supplying liquid alternately to the said tanks, and means operable when a predetermined weight of liquid is delivered to a given tank to divert the flow to the other tank and to prime the siphon of the given tank.

4. Automatic liquid weighing apparatus comprising the combination with a pair of scale members, and a tank carried by each of said members, of a liquid supply conduit, valve mechanism having two alternate positions for controlling the flow of liquid from said conduit to said tanks in alternation, a pair of siphon providing outlets for the respective tanks, and means dependent upon the weight of liquid within a tank into which the same is flowing for moving said valve mechanism to its alternate position and for discharging the weighted liquid through the siphon outlet of the tank containing the same.

5. The invention as set forth in claim 4, wherein said valve mechanism includes a pair of oppositely arranged pistons connected to said valve mechanism, and said means is effective to deliver gas under pressure to said pistons in alternation and to exhaust gas therefrom to the respective siphons to prime the same.

6. The invention as set forth in claim 4, wherein the upper bends of said siphon outlets are located above the highest level to which liquid rises in the said tanks, and the said means delivers gas to the said siphons to prime the same.

In testimony whereof, I affix my signature.

JASPER M. ROWLAND.